US010127257B2

(12) United States Patent
Bothier et al.

(10) Patent No.: US 10,127,257 B2
(45) Date of Patent: Nov. 13, 2018

(54) METHODS OF CREATING A DATABASE AND OF FORMULATING A MAP OF OPERATING STATES OF AIRCRAFT AND A METHOD OF MONITORING THE OPERATION OF AN ASSOCIATED AIRCRAFT

(71) Applicant: SAFRAN AIRCRAFT ENGINES, Paris (FR)

(72) Inventors: Guillaume Bothier, Fontainebleau (FR); Aurelie Gouby, Quincy Sous Senart (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 259 days.

(21) Appl. No.: 14/897,561

(22) PCT Filed: Jun. 6, 2014

(86) PCT No.: PCT/FR2014/051372
§ 371 (c)(1),
(2) Date: Dec. 10, 2015

(87) PCT Pub. No.: WO2014/199057
PCT Pub. Date: Dec. 18, 2014

(65) Prior Publication Data
US 2016/0140155 A1     May 19, 2016

(30) Foreign Application Priority Data

Jun. 10, 2013    (FR) ...................................... 13 55313

(51) Int. Cl.
*G06F 17/30*      (2006.01)
*G05B 23/02*      (2006.01)

(52) U.S. Cl.
CPC ..... *G06F 17/30339* (2013.01); *G05B 23/024* (2013.01); *G06F 17/30345* (2013.01)

(58) Field of Classification Search
CPC ........... G06F 17/3033; G06F 17/30345; G06F 17/30339; G05B 23/024; G06B 23/024;
(Continued)

(56) References Cited

U.S. PATENT DOCUMENTS

2001/0039481 A1* 11/2001 Tremblay ................ C25B 15/02
                                                                             702/35
2007/0174005 A1* 7/2007 Bitar ..................... G01C 23/005
                                                                             701/431

(Continued)

OTHER PUBLICATIONS

French Preliminary Search Report dated Apr. 28, 2014 in Patent Application No. 1355313 (with English translation of categories of cited documents).
(Continued)

*Primary Examiner* — Anh Ly
(74) *Attorney, Agent, or Firm* — Oblon, McClelland, Maier & Neustadt, L.L.P.

(57) ABSTRACT

A method of creating a database of operating states of an aircraft fleet, in which a computer executes the steps of acquiring parameters wherein a state of operation of an aircraft of the aircraft fleet; acquiring at least one item of degradation information indicative of a level of degradation of at least one aircraft from among the fleet of aircraft; storing series of parameters in said database, each series of parameters including parameters wherein a state of operation of one of the aircraft and if the item of degradation information has been acquired, at least one item of degradation information indicative of a level of degradation of the aircraft.

16 Claims, 9 Drawing Sheets

(58) Field of Classification Search
CPC ... B06D 45/10; F02C 9/18; F02C 9/00; F02C 7/232
See application file for complete search history.

(56) References Cited

U.S. PATENT DOCUMENTS

| | | |
|---|---|---|
| 2008/0091630 A1 | 4/2008 | Bonissone et al. |
| 2010/0027006 A1* | 2/2010 | Hertens .................. G01F 1/667 356/335 |
| 2011/0054811 A1* | 3/2011 | Contini ................ B01D 35/143 702/47 |
| 2011/0082605 A1* | 4/2011 | Coulmeau .............. G08G 5/045 701/14 |
| 2012/0310524 A1* | 12/2012 | Pepitone ................ G01C 23/00 701/411 |
| 2013/0041529 A1* | 2/2013 | He ....................... G08G 5/0021 701/17 |
| 2013/0046462 A1* | 2/2013 | Feyereisen ........... G08G 5/0021 701/457 |
| 2013/0325286 A1 | 12/2013 | Lacaille |

OTHER PUBLICATIONS

International Search Report and Written Opinion dated Oct. 8, 2014 in PCT/FR2014/051372 (with partial English language translation).
Jérôme Lacaille, et al., "Visual Mining and Statistics for a Turbofan Engine Fleet" 2011 IEEE Aerospace Conference, XP031938160, 2011, pp. 1-8.
Jérôme Lacaille, "Validation of Health-Monitoring Algorithms for Civil Aircraft Engines" 2010 IEEE Aerospace Conference, XP031657181, 2010, pp. 1-11.

\* cited by examiner

METHODS OF CREATING A DATABASE AND OF FORMULATING A MAP OF OPERATING STATES OF AIRCRAFT AND A METHOD OF MONITORING THE OPERATION OF AN ASSOCIATED AIRCRAFT

FIELD OF THE INVENTION

The invention generally relates to the field for monitoring the operating state of an aircraft.

The invention relates to a method for creating a database of operating states of aircraft, a method for formulating a map of said operating states, and a method for monitoring the operation of an aircraft from such a map.

STATE OF THE ART

In the field of aeronautics, it is important to be able to monitor the operating condition of an aircraft in order to predict and plan maintenance operations on the latter. The operating condition of an aircraft may actually change over time and suitable monitoring may give the possibility of detecting operating anomalies, monitoring a degradation and planning in advance optional maintenance operations. This notably gives the possibility of avoiding delays, of carrying out repairs before degradation is too substantial, and grouping repair operations with each other, etc. . . .

Monitoring tools have been developed in order to identify the anomalies altering the operation of a system of an aircraft, for example its engine, from measurements describing the state of this system.

Documents FR2939924 and FR2942001 describe methods giving the possibility of measuring the operation parameters of an engine to be monitored, of computing the representative indicators of the operating condition of the engine, and of identifying operating anomalies of the engine from said indicators. The identification of operating anomalies resorts to the intervention of experts on the behavior of engines, in order to define reference indicators describing known failures in a caricatured way.

Document FR2972025 describes a method for predicting maintenance operations on an aircraft engine giving the possibility of selecting a relevant failure model from a set of failure models, depending on the age of the engine upon failure, and of associating with the selected failure model decision rules for the intervention depending on a set of parameters relating to the age of the engine as well as to the reconstruction constraints.

Document FR2971595 describes a method for monitoring an engine consisting of collecting over time, measurements on variables relating to an engine to be monitored, determining from the measurements an entry point representing a state of the engine and projecting the entry point on a map of states built during a preliminary learning phase from a set of learning data.

The map of states is a map comprising a set of cells. This map may be built according to a determined compression technique of the Kohonen self-adaptive mapping technique type from learning data from measurements conducted on a fleet of engines.

Once the map is established, different areas of interest of the latter are identified by experts as corresponding to different operating or degradation states. For example, the right lower corner of the map may indicate an increase in the temperature of the exhaust gases revealing a natural phenomenon of wear of the engine.

Measurements of variables relating to the operation of the engine to be monitored are acquired at each flight in different predetermined instants and are used for computing a series of parameters of the engine for each of these instants. Each series of parameters is projected on the map so as to form a trajectory. This trajectory is compared with trajectories followed in the past by other engines and stored previously in a database in order to identify trajectories similar to the one followed by the engine to be monitored. Statistical analysis of these trajectories and of the areas of the map crossed by the latter gives the possibility of diagnosing or predicting possible failures and of anticipating maintenance operations on the engine to be monitored.

A drawback of this method is that it resorts to the intervention of experts for identifying the areas of interest on the map.

Taking into account new failures or new operating states may require a new map to be built.

Now, the addition of novel learning data may lead to a new map totally different from the initial map. For example, an area which was symptomatic of degradation in the initial map may have become a healthy area in the new map. New areas of interest may appear which were not present in the initial map. This has the consequence that it is useful to again involve an expert for identifying on the new map the areas of interest.

Taking into account new failures or new operating states is therefore a long and costly process.

SUMMARY OF THE INVENTION

An object of the invention is to propose a tool allowing automated monitoring of the operating state of an aircraft.

The present invention thus relates according to a first aspect, to a method for creating a database of operating states of a fleet of aircraft, comprising the steps of:
  acquiring parameters characterizing an operating state of an aircraft from among said fleet of aircraft;
  acquiring at least an item of degradation information indicative of a degradation level of at least one aircraft from among said fleet of aircraft;
  storing in said database series of parameters, each series of parameters comprising parameters characterizing an operating state of one of said aircraft and if said item of degradation information has been acquired, at least one item of degradation information indicative of a degradation level of the aircraft.

According to other advantageous and non-limiting features:
  the series of parameters comprise parameters obtained from measurements conducted on actual aircraft having an identified degradation level.
  the series of parameters comprise parameters obtained from a model simulating operation of an aircraft having a predefined degradation level.
  each series of parameters comprises determined parameters from measurements from among an exhaust gas temperature, a fuel flow rate, a speed of rotation of a low pressure shaft, a speed of rotation of a high pressure shaft, and temperatures and pressures in different points of an engine of the aircraft.
  each series of parameters comprises an item of degradation information indicating whether the operating state is "normal" or "degraded".
  each series of parameters comprises an item of degradation information indicating localization of a degradation in the aircraft.

According to a second aspect, the invention relates to a method for formulating a map of operating states of aircraft from a map background established from a database of operating states of a fleet of aircraft created according to the method in accordance with the first aspect, said map background comprising a set of cells, each described by a code vector close to one or several series of parameters stored in said database, in which a computer performs a step of:

defining classes of cells by grouping the cells of the map background, the classes being defined according to a distance between cells and/or degradation information comprised in the series of parameters close to the code vectors of cells from the map background.

The map background may be established from the database of operating states according to the Kohonen self-adaptive mapping technique.

In an embodiment of the method according to the second aspect, the computer performs the step of:

assigning to a cell of the map at least one degradation level relating to an item of degradation information, corresponding to the proportion of series of parameters comprising said item of degradation information from among the series of parameters close to the code vector of said cell.

Further, the classes of cells may be defined by performing the steps of:

creating candidate classes according to intercellular distances;

creating classes, each class grouping a set of adjacent cells, said set of cells being the intersection of a union of candidate classes with a set of adjacent cells each having a degradation level relating to a same item of degradation information greater than a determined threshold.

In an embodiment of the method according to the second aspect, the computer performs the step of:

assigning a label to a class according to the degradation information comprised in the series of parameters close to the code vectors of the cells of said class.

According to a third aspect, the invention relates to a method for monitoring the operation of an aircraft, in which a computer performs the steps of:

determining series of parameters characterizing an operating state of the aircraft to be monitored, from data measured on the aircraft to be monitored, projecting the series of determined parameters in a cell, said target cell, from the map of operating states of aircraft formulated according to the method in accordance with the second aspect, and acquiring said at least one degradation level assigned to said target cell.

In an embodiment of the method according to the third aspect, the computer performs the step of:

establishing a diagnostic of a degradation of the aircraft to be monitored according to the label of at least one class to which belongs said target cell and alternatively according to said at least one acquired degradation level for said target cell.

In an embodiment of the method according to the third aspect, the computer performs the step of:

establishing a forecast of a failure of the aircraft to be monitored depending on a time-dependent change of said at least one degradation level acquired over time.

In an embodiment of the method according to the third aspect, the computer further performs the step of:

updating the recorded data in the database by adding series of parameters comprising the parameters characterizing the operating state of the aircraft to be monitored and an item of degradation information indicative of the diagnosed degradation.

In an embodiment of the method according to the third aspect, the computer further performs the step of:

again formulating the map of operating states from updated data.

According to a fourth aspect, the invention relates to a system for monitoring the operation of an aircraft characterized in that it comprises a computer programmed in order to apply the steps of the methods according to the first, second or third aspects.

PRESENTATION OF THE DRAWINGS

Other features and advantages will further emerge from the description which follows, which is purely illustrative and non-limiting and may be read with reference to the appended figures, wherein.

DETAILED DESCRIPTION OF AN EMBODIMENT

Figure 2:
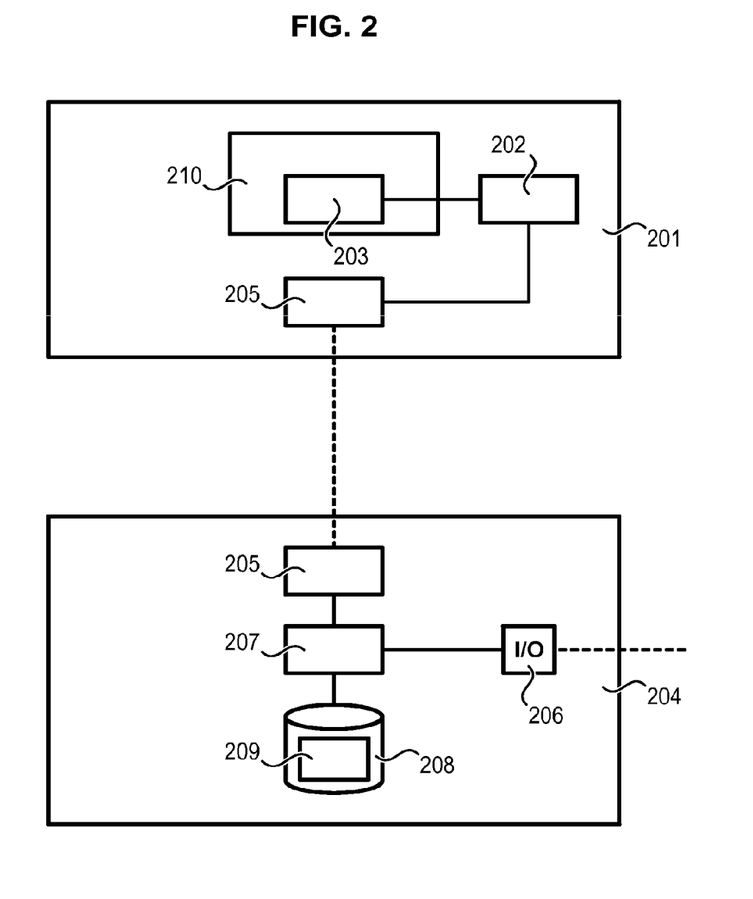

FIG. 2 illustrates material means applied within the scope of the invention.

During each flight, an aircraft 201 records data relating to the operation of its different systems (called "system data"), such as its engine 210, its computers, its hydraulic system, its electric system, etc. . . . on the one hand and data relating to the environment in which the aircraft 210 moves (called "environmental data") on the other hand. The environmental data notably give the possibility of knowing whether the systems of the aircraft operate in a rated state or not. These system and environmental data give the possibility of controlling and monitoring the operation of the systems of the aircraft.

The data are recorded by on-board computers 202 (for example FADEC, ACMS etc.) from measurements obtained via sensors 203 integrated to the aircraft 201.

As an illustration, the system data relating to an engine of the aircraft are measured by sensors integrated to the engine and recorded by the FADEC controlling the engine. As an example, the measured engine data comprise the temperature of the exhaust gases, the fuel flow rate, the speed of rotation of the low pressure shaft, the speed of rotation of the high pressure shaft, the temperatures and pressures in different points of the engine, etc.

The measured environmental data may comprise the altitude of the aircraft, the external temperature, the position of the VBV discharge valve, set value of the low pressure turbine, the air intake levels in the compressors, the speed of the aircraft (in Mach units), etc.

The aircraft 201 regularly transmits to a ground-based station 204 messages containing the data recorded by the on-board computers 202, as well as data and identifier acquisition dates allowing identification of the relevant systems and aircraft. Usually, the data transmitted by the computers relate to values of parameters measured during predetermined phases of each flight, typically during the take-off phase and during a flight phase at a high altitude. The data are transmitted in messages (snapshots) sent via a communication interface 205 between the aircraft and the ground-based station. The communication interface 205 may apply a procedure from among AGARS, PCMCIA, 3G procedures etc.

The ground-based station 204 usually includes an input-output interface 206, processing means 207 as a computer, and storage means 208 as a database.

The ground-based station 204 receives the messages transmitted at various dates by various aircraft and for various systems. The data contained in the messages are stored in the database 208.

The computer is programmed for processing the data in order to formulate a map of operating states of aircraft and monitor the operating state of the aircraft.

For this purpose, the computer determines a set of operating parameters of the aircraft from data transmitted by the aircraft.

More specifically, the computer corrects the system data by means of the associated environmental data.

This correction notably gives the possibility of suppressing the influence of the environment on the measured system data so as to suppress the influence of the outdoor conditions, and so that the corrected system data only depend on the state of the system.

Other processing operations may be carried out, for example for attenuating noise. The obtained corrected system data by the processing means are used for forming a set of parameters 209 stored in the database 208 of the ground-based station 204.

Figure 1:
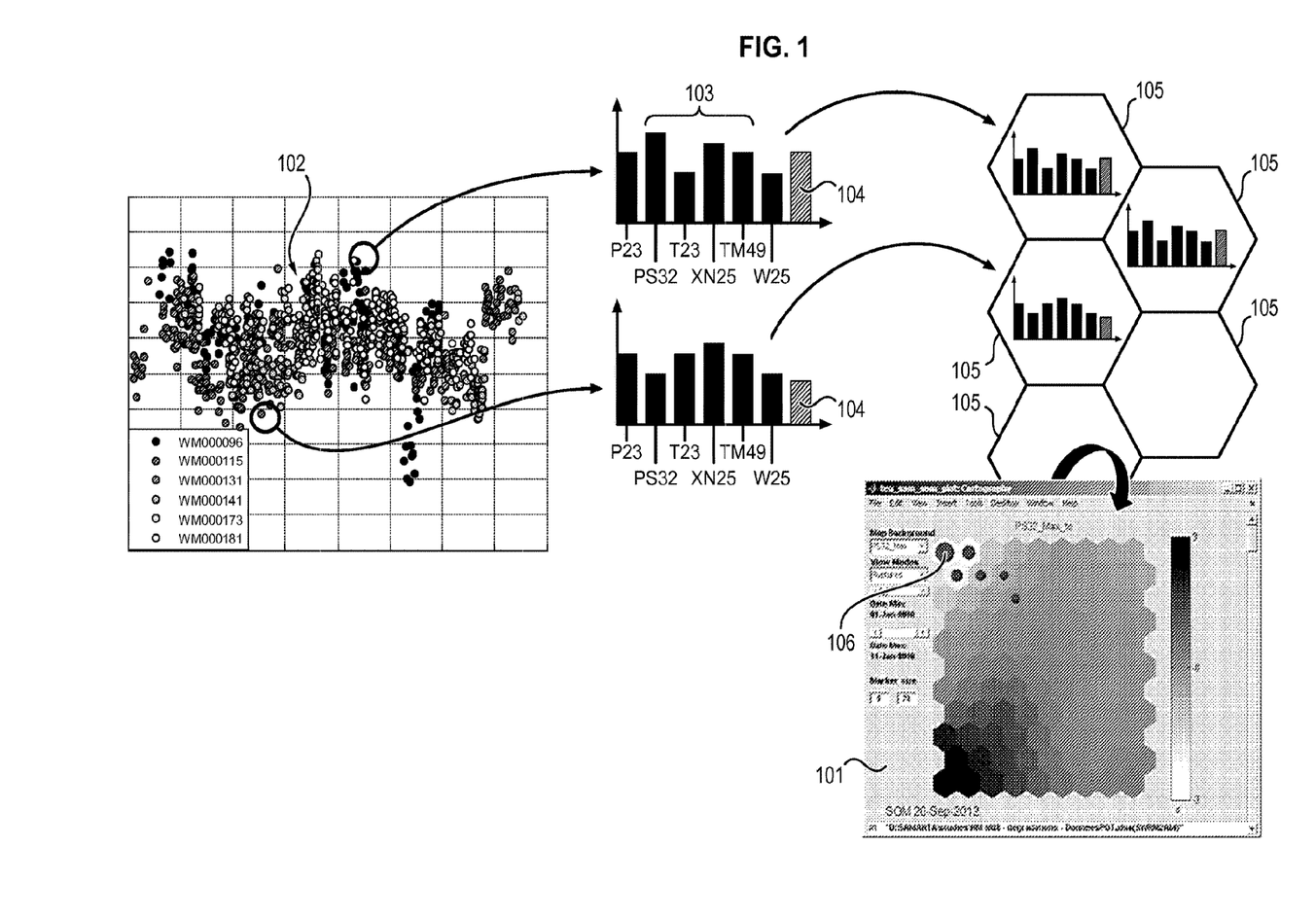
FIG. 1 schematically illustrates a two-dimensional map example of operating states of aircraft, FIG. 2 schematically illustrates the material means applied within the scope of the invention.

The monitoring of the operating state of an aircraft is achieved by means of a two-dimensional map 101, such as the one which is illustrated in FIG. 1, illustrating a set of aircraft operating states. Such a map may only relate to the operating state of a single system of an aircraft, such as its engine, or else represent a set of operating states of an aircraft on the whole. The map 101 is established from a database such as the database 208. The database and the map are built in a way specific to the invention, during the application of the methods according to the invention.

Figure 3:
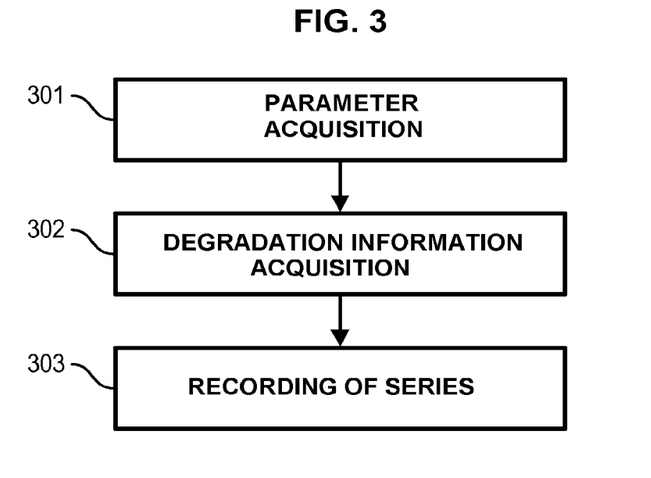
FIG. 3 is a flowchart illustrating steps for creating a database of operating states of aircraft according to an embodiment of the invention.

FIG. 3 illustrates a flowchart illustrating steps for creating a database of operating states of aircraft.

According to a first step 301, parameters characterizing an operating state of a set of aircraft of the same category as the aircraft to be monitored are acquired by the computers 202 or 207.

According to a first alternative, said parameters are obtained from data comprising system data which have been measured by sensors 203 integrated to an aircraft and environmental data relating to the environment in which operates this aircraft. These parameters are associated with a data acquisition date and identifiers giving the possibility of identifying the relevant system and aircraft.

The system data for example comprise the temperature of the exhaust gases, the fuel flow rate, the speed of rotation of the shafts of an engine, the temperatures and pressures in different points of the engine.

The environmental data may comprise the altitude of the aircraft, the outdoor temperature, the position of the VBV discharge valve, said value of the low pressure turbine, the air intake levels in the compressors, the speed of the aircraft (in Mach units), etc.

Said system and environmental data, measured by sensors 203, are acquired by the on-board computer 202 or else transferred by the latter to the computer 207 of the ground-based station 204. Such an acquisition may be carried out in flight, on the ground, in the workshop, etc. . . .

The parameters characterizing an operating state may notably be acquired by suppressing the influence of the environment on the measured system data. Such a calculation may be achieved with the computers 202 or 207.

According to a second alternative, a digital model of an aircraft or of one or several systems of an aircraft may be used for acquiring, by simulation, parameters characterizing an operating state of an aircraft or of a system for a predefined degradation level. Such a simulation may advantageously be achieved by the computer 207.

The use of a digital model gives the possibility of simulating degradations of an aircraft or of one of its systems, not observed on actual aircraft and of therefore obtaining a more complete set of data, further covering possible operating and degradation states, and accordingly limiting the need of an update of the map of operating states established from this database.

According to a second step 302, an item of degradation information (referenced as 104 in FIG. 1) is acquired for at least one of said aircraft. The item of degradation information is indicative of the degradation level of the aircraft or of one of its systems for which the operating parameters have been computed. The item of degradation information may also indicate the system concerned by this degradation.

In the case of a real aircraft, the item of degradation information may come from the analysis conducted during an operation for maintenance of the faults exhibited by the aircraft.

In the case of parameters obtained from a digital model, the item of degradation information corresponds to the degradation level having been used for simulating the operation of the aircraft or of its systems and for calculating the parameters.

The degradation information may characterize in a more or less fine way the operating state of the aircraft or of its systems. The item of information may depend on the type of desired map and of the desired accuracy level of the failure diagnostic.

The item of degradation information may for example assume two values, i.e. a first value indicative of a "normal" operating state and a second value indicative of a "degraded" operating state.

If a higher accuracy level is required, the item of degradation information may also indicate localization of a degradation in the aircraft. For example, the item of degradation information may characterize a degradation of the HP compressor.

A degradation which is described too accurately is more of a constraint since it will be less likely to be reproduced and the number of different items of degradation information present in the database to be taken into account for creating the map will therefore be multiplied. On the other hand, the use of a more accurate item of degradation information allows finer interpretation of the map.

According to a third step 303, series of parameters each comprising parameters characterizing an operating state of an aircraft on the whole or of a system of an aircraft acquired in step 301 and if necessary an item of degradation information acquired in step 302 are recorded by the computer 207 in the database 208.

Advantageously, each series of parameters may comprise several items of degradation information indicative of a degradation level. During the formulation of the map of operating states from series of parameters from the database, the desired degradation information type may be selected by selecting the item of degradation information having the required accuracy.

According to an alternative, the steps 301 to 303 may be applied repeatedly for several aircraft or systems of aircraft, the application of these steps for an aircraft or a system being independent of the application of similar steps for another aircraft or even another system of the same aircraft.

The database thus contains a plurality of series of parameters obtained from measurements collected over time or by simulation, relating to different aircraft and different systems. These series of parameters are associated with acquisition dates or flight dates, as well as with identifiers allowing identification of the relevant systems and aircraft.

The set of data obtained for the aircraft on the whole or for a particular system 102 is illustrated in FIG. 1 by a set of points, each point being defined by series of parameters 103 computed or measured for a given aircraft, for a given flight and optionally for a given system.

Figure 4:
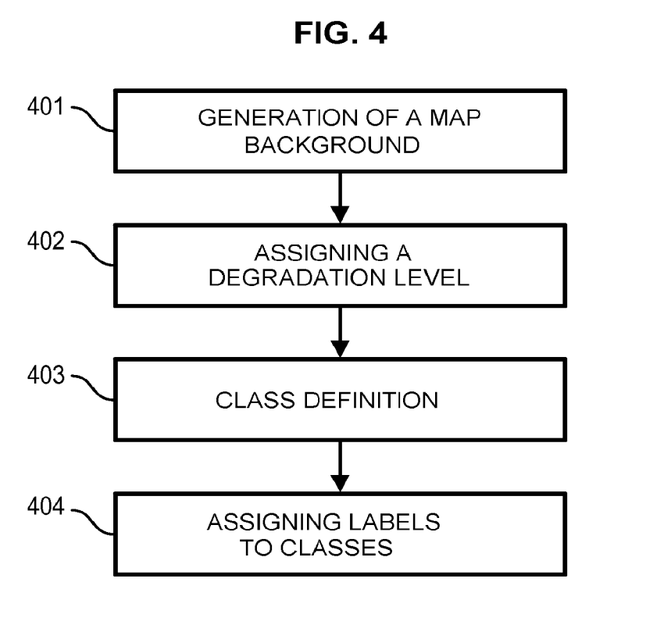
FIG. 4 is a flowchart illustrating steps of the method for formulating a map of operating states of aircraft according to an embodiment of the invention, FIGS. 5a to 5d schematically illustrate examples of maps on which classes are defined according to the method for formulating a map of operating states of aircraft according to an embodiment of the invention.

FIG. 4 is a flowchart illustrating steps of a method for formulating a map of the operating states according to an embodiment of the invention.

The computer 207 formulates the map 101 from the set of data recorded in the database 209 which was made up. Such a map may represent operating states of aircraft as a whole or else only operating states of a particular system, such as one of the aircraft engines.

According to a first step 401, a map background of operating states is produced. Such a map background consists in a grid comprising a predetermined number of cells (referenced as 105 in FIG. 1). Each cell is characterized by a position on the map background and a vector with values, called a code vector. The code vectors of the cells are adapted so as to be close to the parameter series 103 stored in the database Each cell may thus be brought closer, in the multidimensional space of the series of parameters, to one or several similar series of parameters. Each of these series may comprise an item of degradation information.

The cells of the map may thus be brought closer to the series of parameters stored in the database according to the Kohonen self-adaptive projection or mapping technique.

Such a technique modifies the code vectors of the cells of the map background so as to adjust as finely as possible, in the multidimensional space of the series of parameters, the meshing of cells to a layer on which are located the series of parameters stored in the database. The Kohonen projection technique then gives the possibility of grouping on the map the series of parameters corresponding to identical or close operating states, thereby creating on the map areas corresponding to such operating states. Kohonen mapping is thus particularly suitable for analyzing the distribution of data in a large size multidimensional space like the space of the operating states of an aircraft.

According to an embodiment, the computer 207 assigns to at least one cell of the map at least one degradation level during a step 402. This degradation level is relative to an item of degradation information and corresponds to the proportion of the series of parameters comprising said item of degradation information from among the set of series of parameters close to the code vector of this cell. If series of parameters comprising various items of degradation information are close to the code vector of a cell, it is possible to define for this cell, a degradation level for each of these items of degradation information. For a statistically significant number of series of parameters close to the code vector of a given cell comprising an item of degradation information, the degradation level relative to an item of degradation information for this cell therefore represents the minimum probability that a system or an aircraft having a operating state similar to that of the series of parameters close to the code vector of the cell is affected by said degradation.

According to an alternative, the adaptation of the code-vectors of the different cells of the map to the series of parameters also depends on the items of degradation information of said series of parameters.

The Kohonen projection technique then gives the possibility of grouping on the map the cells for which the code vectors are close to the series of parameters containing identical or close items of degradation information, thereby creating on the map areas corresponding to identical or close degradations. This gives the possibility of guaranteeing that the groups of operating states on the map correspond to degradation levels which one seeks to identify.

According to a step 403, the computer defines classes of cells grouping cells of the map 101, the classes being defined according to the distances between the cells of the map and/or on items of degradation information comprised in the series of parameters close to the code-vectors of cells of the map. Such classes give the possibility of automatically and specifically defining areas of interest of the map corresponding to an operating or degradation state, without the intervention of an expert.

The defined classes may be disconnected or may overlap.

The classes may also only contain cells for which the code-vectors are close to series of parameters comprising an item of degradation information or else only the cells for which the code-vectors are close to series of parameters not comprising any degradation information.

In order to facilitate the interpretation of the map, the map may be displayed on a screen with each cell of the map illustrated with a given color depending on the class to which the cell belongs. The cells of a same class may be displayed with a same color.

In an embodiment, according to a step 404, the computer 207 assigns a label to at least one of the classes defined in step 403, depending on the degradation information comprised in series of parameters close to the code-vectors of the cells grouped in this class.

The label of a class thus allows characterization in an automatic way of the operating or degradation state associated with an area of the map covered by this class, without the intervention of an expert.

In an alternative, the classes to which no label has been assigned may exhibit a field which may be modified by the user.

Figure 5A:
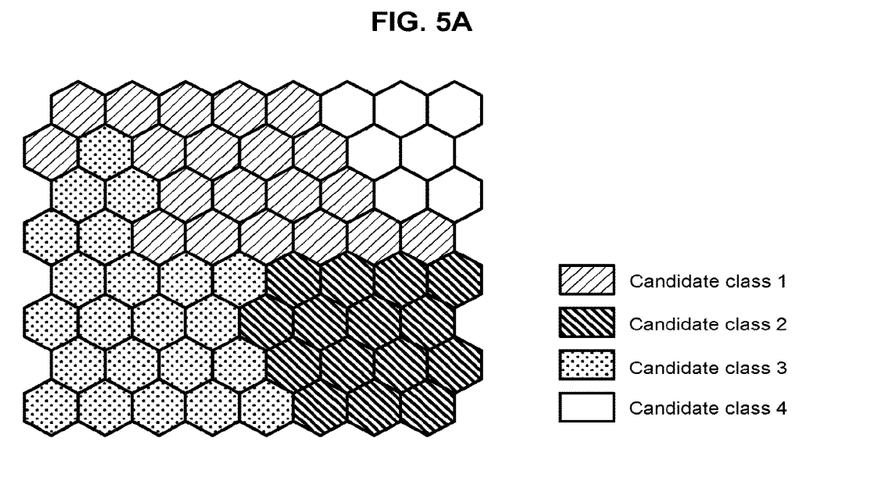

According to a first embodiment, the computer 207 groups the cells in different classes according to the code-vectors assigned to these cells. More specifically, the computer groups the cells of the map in classes of cells, according to the distance between cells defined as the norm of the deviation between the code-vectors assigned to the cells. This distance may for example be a Euclidean distance or a Mahalanobis distance. Advantageously, the computer computes the distances between the cells of the map, classifies these distances as a hierarchy or by the k-means method and creates candidate classes grouping cells of the map according to these distances, as illustrated in FIG. 5*a*.

According to a first alternative, the computer groups the cells of the map in a predefined number of classes so called candidate classes so as to minimize in each class the maximum distance between the cells of the candidate class.

According to another alternative, the number of candidate classes is not imposed and the computer groups in a candidate class all the cells having between them a distance less than a predetermined threshold distance.

For each candidate class, a class without a label is then created, leaving the possibility to a user to manually assign subsequently a label to these classes.

According to an alternative for such classes, the computer assigns a label not indicating any degradation, for example a label "Class without a label 1".

According to a second embodiment, illustrated in FIG. 5*b*, the computer determines candidate classes as described above and then determines subsequently for each candidate class or union of candidate classes whether there exists an intersection between the latter and a set of adjacent cells of the map having a degradation level associated with a same item of degradation information greater than a predetermined threshold.

If such an intersection exists, a class grouping the cells of this intersection is created and a label corresponding to this item of degradation information, then called an item of degradation information of the class, is automatically associated with the class by the computer 207.

According to an alternative, the class created may comprise cells belonging to a candidate class but having a degradation level associated with an item of degradation information of the class below the predetermined threshold if they are surrounded by cells belonging to the candidate class and having a degradation level greater than the predetermined threshold.

Figure 5B:
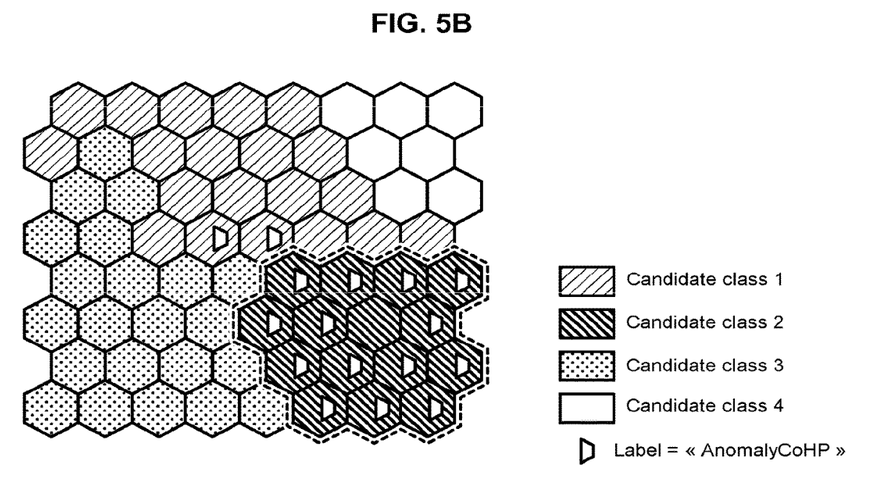

According to another alternative, also illustrated in FIG. 5*b*, the created class may comprise cells belonging to a candidate class but for which the code-vectors are close to series of parameters not comprising the item of degradation information of the class if they are surrounded with cells belonging to the candidate class and for which the code-vectors are close to series of parameters comprising the item of degradation information of the class.

Figure 5C:
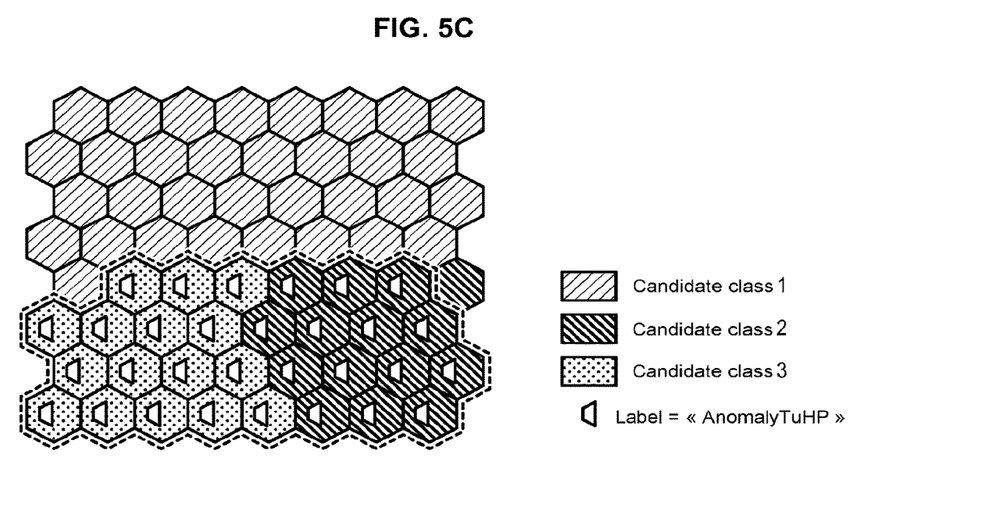

According to an embodiment, illustrated in FIG. 5*c*, the created class may group cells belonging to several candidate classes if these candidate classes comprise cells having a degradation level associated with a same item of degradation information greater than a predetermined threshold.

Figure 5D:
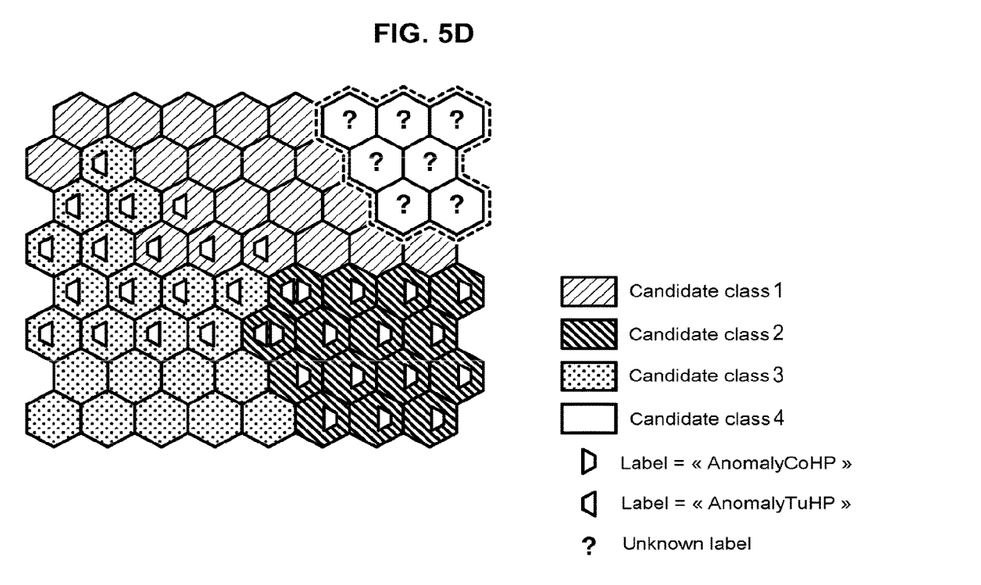

Alternatively, illustrated in FIG. 5*d*, if a candidate class does not have any intersection with a set of cells for which the code-vectors are close to series of parameters comprising items of degradation information, i.e. if a candidate class only groups cells for which the code-vectors are close to series of parameters without any item of degradation information, a class may be created and a label of the type "Class without a label" may be assigned to it. An operator may then manually assign a label to these classes subsequently.

According to a third embodiment, the classes are only defined according to degradation information of the series of parameters close to the code-vectors of the cell. If a set of cells has a degradation level associated with a same item of degradation information greater than a predetermined threshold, a class is defined. A label corresponding to this item of degradation information, a so-called item of degradation information of the class, is automatically associated with the class by the computer 207.

In this third embodiment, according to an alternative, the created class may comprise cells having a degradation level associated with the item of degradation information of the class below the predetermined threshold if these cells are surrounded by cells having a degradation level associated with the item of degradation information of the class greater than the predetermined threshold. According to another alternative, the created class may group cells for which the code-vectors are close to series of parameters not comprising degradation information of the class if the latter are surrounded by cells for which the code-vectors are close to series of parameters comprising the item of degradation information of the class and having an associated degradation level greater than a predetermined threshold.

Figure 6:
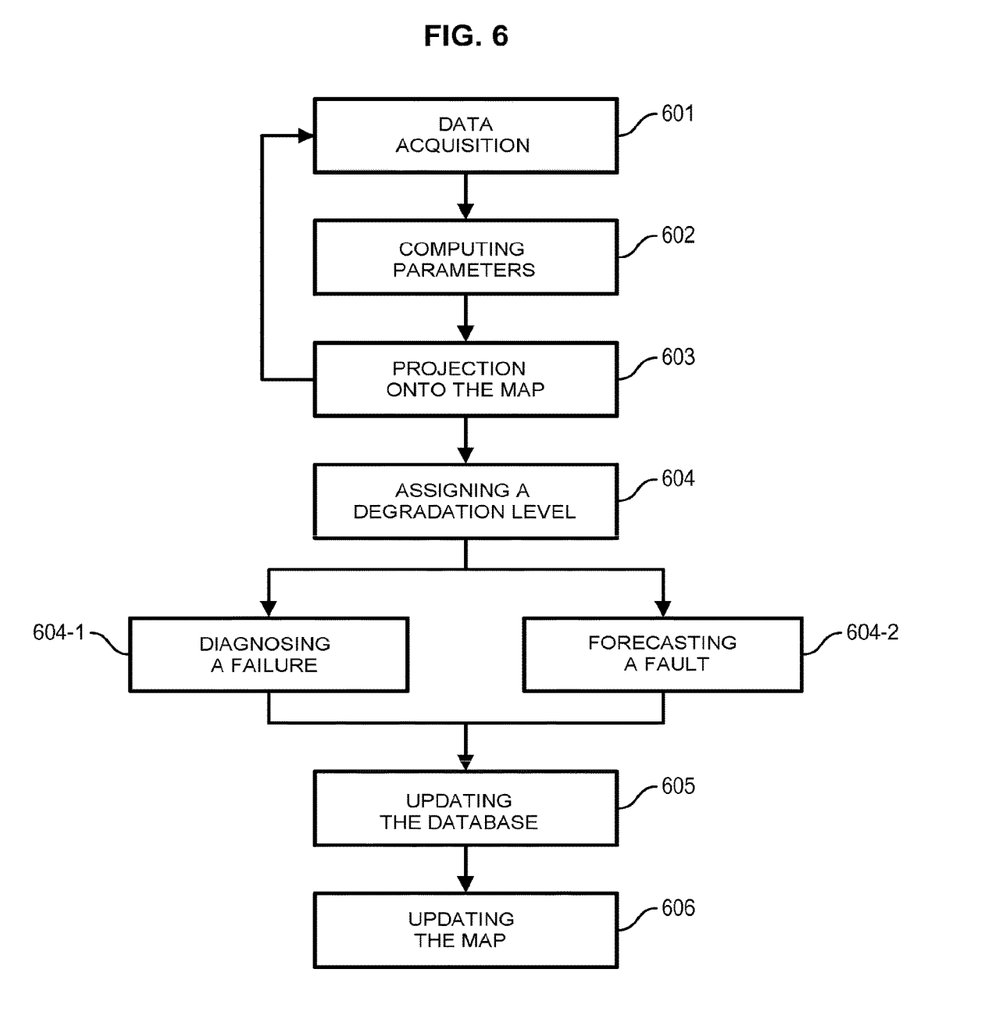
FIG. 6 is a flowchart illustrating steps of a method for monitoring the state of an aircraft according to an embodiment of the invention.

FIG. 6 is a flowchart illustrating steps of the method for monitoring the operating state of an aircraft according to an embodiment of the invention from a map formulated according to steps 401 to 404 of FIG. 4.

The computer 202 or 207 is programmed for executing the following steps.

According to a first step 601, the ground-based station receives a series of data relating to the operation of the aircraft to be monitored. These data are of the same type as those which have been acquired during step 301 of FIG. 3. The received series of data comprises system data which have been measured by sensors integrated to the aircraft to be monitored, environmental data relating to the environment in which operates the aircraft, a data acquisition date and identifiers allowing identification of the relevant system and aircraft.

According to a second step 602, the computer computes parameters characterizing the operating state of the aircraft from the series of data received in the preceding step, notably by suppressing the influence of the environment on the measured system data.

According to a third step 603, the parameters obtained for the aircraft on the whole or for one of its systems are projected on the map of operating states formulated previously with the method of FIG. 4. This projection step may be achieved by using the Kohonen technique or any other projection technique. An image point reflecting the position of the series of parameters obtained relatively to the series of parameters used for establishing the map background, is then formed on the map.

The steps 601 to 603 may be applied repeatedly so as to project on the map several series of parameters corresponding to operating states at different instants of the life of the aircraft. This gives the possibility of viewing on the map the time-dependent change of the aircraft or of one of its systems over time, as a trajectory. According to an alternative, a time-dependent change is illustrated on a map by a series of circles with variable color positioned in the cells of the map in which the series of parameters are projected, the diameter of the circles decreasing gradually with time, in order to allow an operator to immediately view the direction of the change of the operating state.

Further, during a step 604, at least one degradation level assigned to said target cell is acquired for said aircraft to be monitored or for one of its systems.

During a step 604-1 a degradation diagnostic may be established according to the label of at least one class to which said target cell belongs and alternatively on at least said degradation level acquired for said target cell.

If the target cell belongs to a class to which was assigned a label, the degradation may be characterized by the label of this class. Alternatively, the diagnostic may also include the degradation level of the target cell relating to the item of degradation information of the class, this level expressing a minimum probability that the aircraft or the system to be monitored has a degradation corresponding to the item of degradation information. If the target cell belongs to several classes having different labels, several diagnostics may be established. The degradation levels of the target cell may be stored.

If the target cell does not belong to a class to which was assigned a label, no diagnostic is established. The degradation levels of the cell may however be stored.

According to an alternative, a diagnostic is established from degradation information of the neighboring cells of the target cell if they belong to the same class as the target cell.

During a step 604-2, a forecast of a failure of the aircraft to be monitored or of one of its systems may be established by the computer depending on the time-dependent change of said at least one degradation level acquired over time.

The degradation levels relating to the different items of degradation information of the target cells attained during various flights may be stored in order to be able to track their change over time.

Figure 7A:
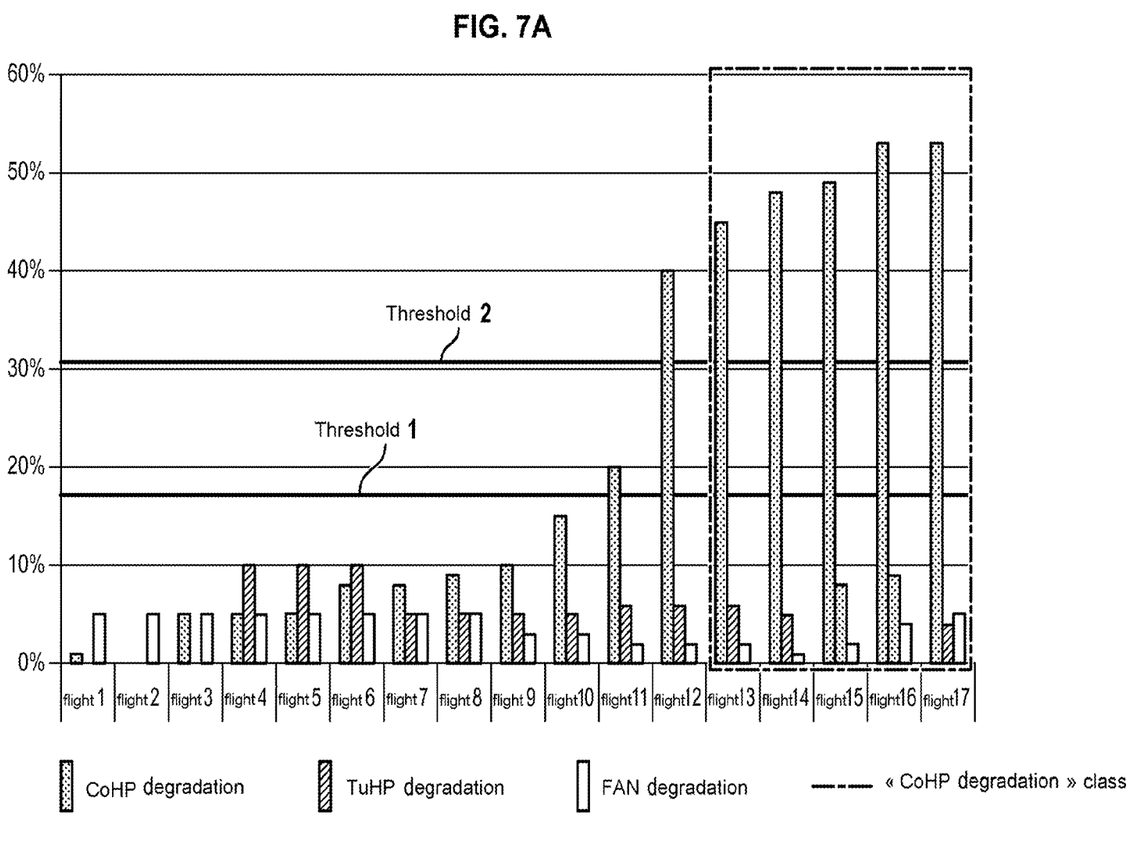
FIGS. 7a and 7b illustrate diagrams of degradation levels giving the possibility of establishing a forecast of a failure of an aircraft to be monitored according to the method for monitoring the state of an aircraft according to an embodiment of the invention, FIG. 8 schematically illustrates an example of a map of operating states on which is illustrated a time-dependent change in the position of an aircraft to be monitored giving the possibility of establishing a forecast of a failure of said aircraft according to the method for monitoring the state of an aircraft according to an embodiment of the invention.

In a first embodiment illustrated in FIG. 7A, different thresholds may be set. When a degradation level exceeds one of these thresholds, an alert may be generated.

Figure 7B:
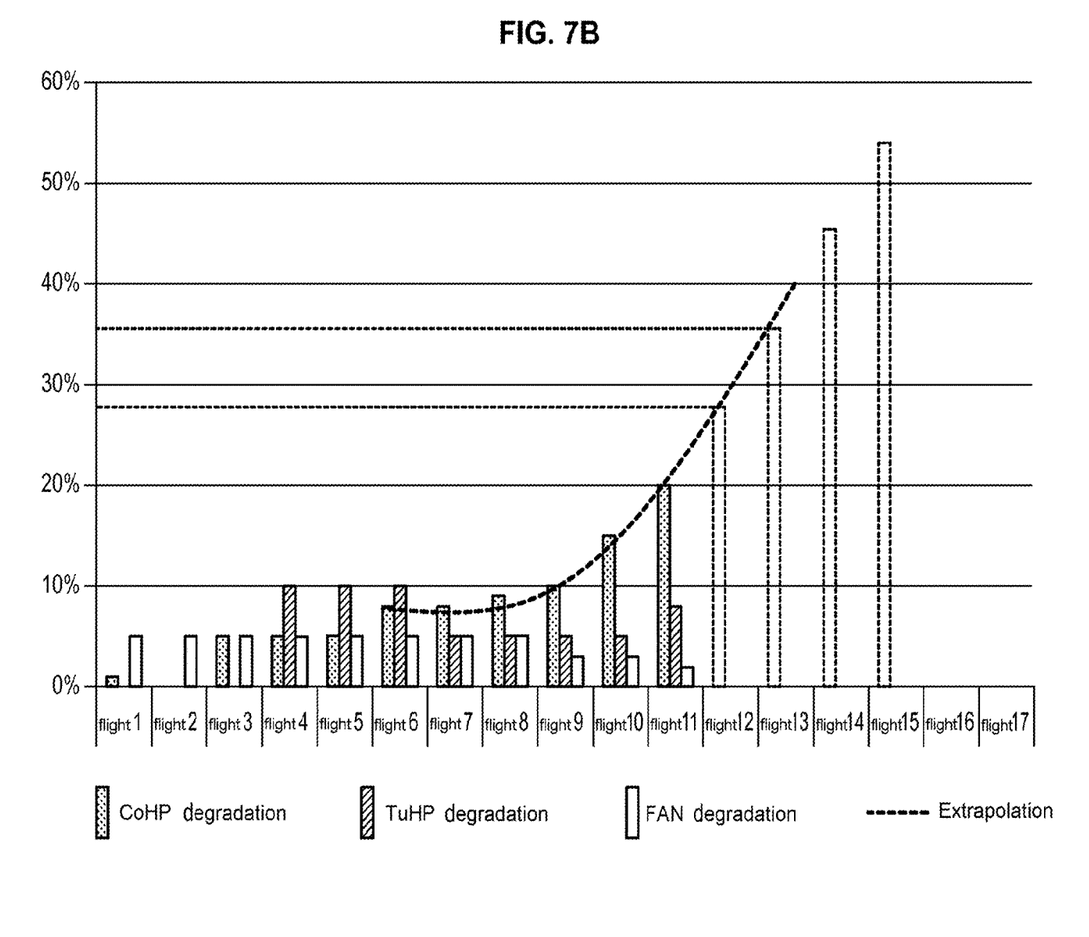
Figure 8:
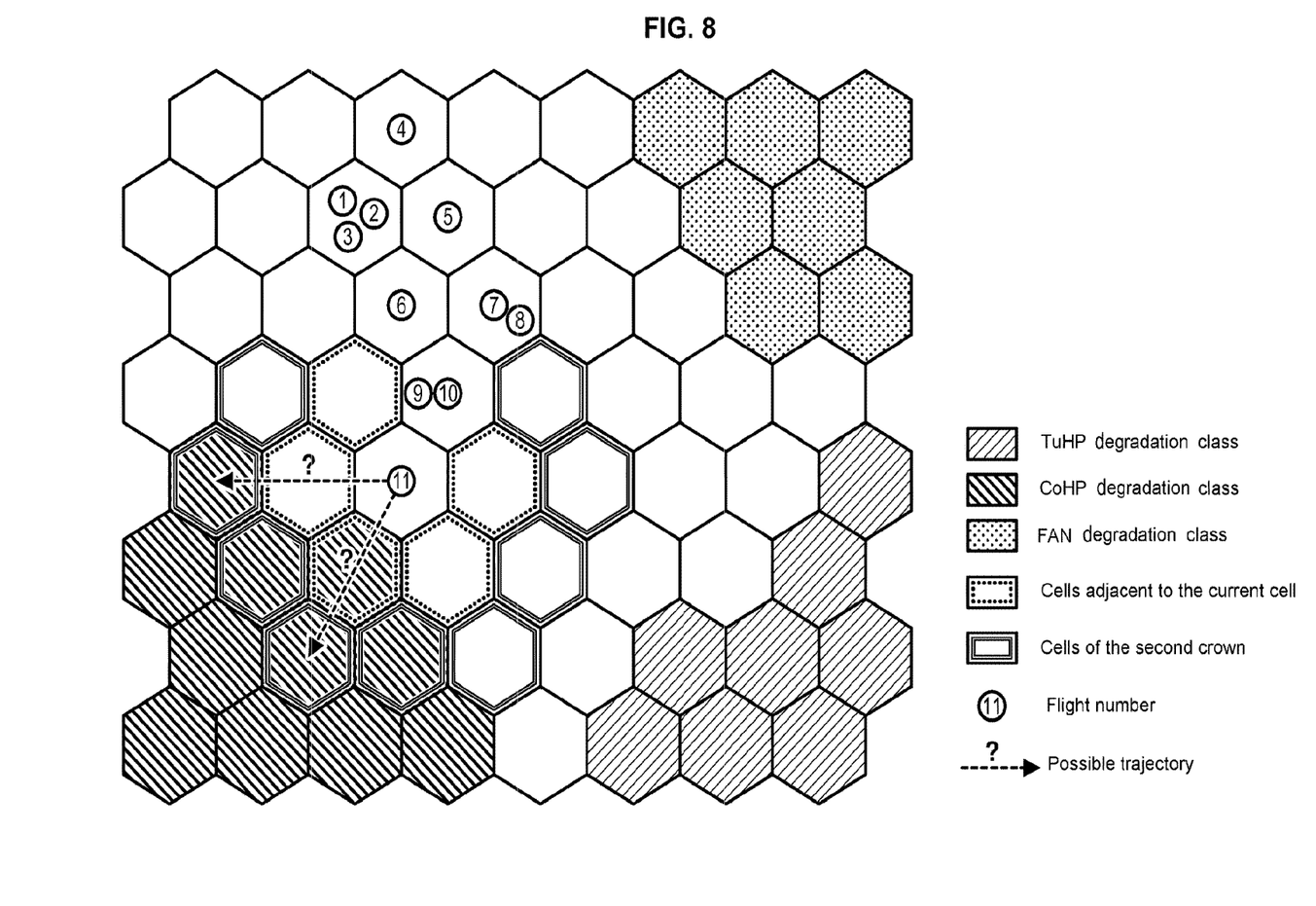

In a second embodiment illustrated in FIG. 7B, an extrapolation over a certain number of flights is carried out from the time-dependent change in a degradation level stored for determining an estimated future degradation level. This extrapolation may be a linear regression or of a higher order. It may be made for example from the n last flights. Such an extrapolation may be achieved for each of the degradation levels, the time-dependent change of which is tracked. The estimated future degradation level is then compared with the degradation levels of the different cells of the map. Alternatively, as illustrated in FIG. 8, the estimated future degradation level is compared with the levels of the cells adjacent to the target cell or with the levels of the cells of the n first crowns surrounding the target cell, for example with the levels of the cells of the second crown. If an adjacent cell or of one of the n first crowns, said estimated future target cell, has a degradation level similar to or identical with the estimated degradation level, an alert is generated. This alert may comprise the remaining delay before the degradation alters the operation of the aircraft. Alternatively, the degradation levels of the estimated future target cell may be acquired.

In an alternative of this second embodiment, an alert is only generated if the estimated future target cell belongs to a class.

According to another embodiment, the trajectory of the aircraft to be monitored or of one of its systems may be compared with items of trajectories followed in the past by other aircraft and stored previously in the database for seeking similar trajectories. A statistical analysis of these trajectories and of the classes of the map crossed by the latter would give the possibility of anticipating maintenance operations on the aircraft to be monitored.

Further, at the end of the diagnostic, according to a fifth step 605, the computer may update the database of the operating states by adding thereto the series of parameters comprising the parameters characterizing the operating state of the aircraft to be monitored or of one of its systems and the indicative item of degradation information of the determined degradation level during the diagnostic step 604-1.

According to a sixth step 606, the computer may update the map of the operating states from updated data in the fifth step 605 in order to increase the accuracy of the diagnosis or the forecast.

Alternatively, only the classes may be redefined during this updating.

This updating step may be carried out regularly.

The invention claimed is:

1. A method for monitoring an operating state of an aircraft in order to predict and plan maintenance operations on the aircraft,
   from a map of operating states of aircraft representative of a multidimensional space of the operating states of the aircraft,
   the map of operating states being produced from a map background established from a database of operating states of a fleet of aircrafts storing series of parameters related to operating states of aircrafts of the fleet of aircrafts, each parameter being a value of a characteristic of the aircraft,
   each series of parameters related to operating states of aircrafts of the fleet of aircrafts comprising parameters characterizing an operating state of one of the aircraft of the fleet of aircrafts and optionally degradation information data indicative of a degradation level of the one of the aircraft,
   the map background comprising a set of cells, each cell characterized by a position on the map background and described by a code vector close to one or plural series of parameters related to operating states of aircrafts of the fleet of aircrafts stored in the database, said code vector being a vector with values,
   at least one degradation level being assigned to at least one of the cells, relative to degradation information data, corresponding to proportion of the series of parameters related to operating states of aircrafts of the fleet of aircrafts comprising degradation information data from among of the series of parameters related to operating states of aircrafts of the fleet of aircrafts close to the code vector of said cell,
   wherein a computer performs:
   determining a series of parameters characterizing an operating state of the aircraft to be monitored, from data measured on the aircraft the operating state thereof is to be monitored;
   projecting the series of parameters onto the map of operating states of aircraft at an image point reflecting the position of the series of parameters obtained relatively to the series of parameters used for establishing the map background, the image point in a target cell of the map of operating states of aircraft; and
   acquiring the at least one degradation level assigned to the target cell,
   the method further comprising predicting and planning maintenance operations on the aircraft based on the acquired degradation level.

2. The method according to claim 1, wherein the series of parameters comprise parameters obtained from measurements conducted on actual aircraft having an identified degradation level.

3. The method according to claim 1, wherein the series of parameters comprise parameters obtained from a model simulating operation of an aircraft having a predefined degradation level.

4. The method according to claim 1, wherein each series of parameters comprises parameters determined from measurements from among a temperature of exhaust gases, a fuel flow rate, a speed of rotation of a low pressure shaft, a speed of rotation of a high pressure shaft, and temperatures and pressures in different points of an engine of the aircraft.

5. The method according to claim 1, wherein each series of parameters comprises degradation information data indicating whether an operating state is normal or degraded.

6. The method according to claim 1, wherein each series of parameters comprises degradation information data indicating localization of a degradation in the aircraft.

7. The method according to claim 1, wherein the map background is established from the database of operating states according to a self-adaptive Kohonen mapping technique.

8. The method according to claim 1, wherein the map of operating states further comprises classes of cells by grouping the cells of the map background, the classes being defined according to a distance between cells or degradation information data comprised in the series of parameters close to the code vectors of cells from the map background, or the classes being defined according to a distance between cells and degradation information data comprises in the series of parameters close to the code vectors of cells from the map background.

9. The method according to claim 8, wherein each class groups a set of adjacent cells, the set of cells being the intersection of a union of candidate classes, generated according to the distances between cells, with a set of adjacent cells each having a degradation level relative to a same item of degradation information data greater than a determined threshold.

10. The method according to claim 8, wherein a label is assigned to a class according to degradation information data comprised in the series of parameters close to the code vectors of the cells of the class.

11. The method according to claim 10, wherein the computer further performs:
establishing a diagnostic of a degradation of the aircraft to be monitored according to a label of at least one class to which the target cell belongs.

12. The method according to claim 11, wherein the computer further performs:
establishing a diagnostic of a degradation of the aircraft to be monitored according to the at least one acquired degradation level for the target cell.

13. The method according to claim 11, wherein the computer further performs:
updating the data recorded in the database by adding series of parameters comprising the parameters characterizing the operating state of the aircraft to be monitored and of degradation information data indicative of the diagnosed degradation.

14. The method according to claim 13, wherein the computer further performs:
again formulating the map of operating states from updated data.

15. The method according to claim 1, wherein the computer further performs:
establishing a forecast of a failure of the aircraft to be monitored according to a time-dependent change of the at least one degradation level acquired over time.

16. A system for monitoring an operating state of an aircraft in order to predict and plan maintenance operations on the aircraft, the system comprising:
an input-output interface configured to receive data measured on the aircraft;
a database for storing a map of operating states of the aircraft; and
a computer comprising a processor and a memory, the computer programmed for applying a method for monitoring an operating state of the aircraft in order to predict and plan maintenance operations on the aircraft,
from a map of operating states of aircraft representative of a multidimensional space of the operating states of the aircraft,
the map of operating states being produced from a map background established from a database of operating states of a fleet of aircrafts storing series of parameters related to operating states of aircrafts of the fleet of aircrafts, each parameter being a value of a characteristic of the aircraft,
each series of parameters related to operating states of aircrafts of the fleet of aircrafts comprising parameters characterizing an operating state of one of the aircraft of the fleet of aircrafts and optionally degradation information data indicative of a degradation level of the one of the aircraft,
the map background comprising a set of cells, each cell characterized by a position on the map background and described by a code vector close to one or plural series of parameters related to operating states of aircrafts of the fleet of aircrafts stored in the database, said code vector being a vector with values,
at least one degradation level being assigned to at least one of the cells, relative to degradation information data, corresponding to proportion of the series of parameters related to operating states of aircrafts of the fleet of aircrafts comprising the degradation information data from among of the series of parameters related to operating states of aircrafts of the fleet of aircrafts close to the code vector of said cell, the computer being configured to:
determine a series of parameters characterizing an operating state of the aircraft to be monitored, from data measured on the aircraft the operating state thereof is to be monitored;
project the series of parameters onto the map of operating states of aircraft at an image point reflecting the position of the series of parameters obtained relatively to the series of parameters used for establishing the map background, the image point in a target cell of the map of operating states of aircraft; and
acquire the at least one degradation level assigned to the target cell.

* * * * *

UNITED STATES PATENT AND TRADEMARK OFFICE
CERTIFICATE OF CORRECTION

PATENT NO. : 10,127,257 B2  
APPLICATION NO. : 14/897561  
DATED : November 13, 2018  
INVENTOR(S) : Guillaume Bothier et al.

It is certified that error appears in the above-identified patent and that said Letters Patent is hereby corrected as shown below:

In the Specification

Column 5, Line 25, change "among AGARS" to --among ACARS--;

In the Claims

Column 12, Line 48, change "comprising degradation" to --comprising the degradation--; and Column 13, Line 41, change "same item of degradation" to --same degradation--.

Signed and Sealed this  
Tenth Day of March, 2020

Andrei Iancu  
*Director of the United States Patent and Trademark Office*